United States Patent
Stol

(10) Patent No.: US 7,371,994 B2
(45) Date of Patent: May 13, 2008

(54) BURIED ARC WELDING OF INTEGRALLY BACKED SQUARE BUTT JOINTS

(75) Inventor: Israel Stol, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 70 days.

(21) Appl. No.: 10/913,096

(22) Filed: Aug. 5, 2004

(65) Prior Publication Data

US 2006/0027549 A1 Feb. 9, 2006

(51) Int. Cl.
*B23K 9/23* (2006.01)

(52) U.S. Cl. .................. 219/137 R; 219/137 WM; 219/127

(58) Field of Classification Search .......... 219/130.1, 219/137.2, 137 R, 130.33, 137 PS, 137 WM
See application file for complete search history.

(56) References Cited

U.S. PATENT DOCUMENTS

| | | | |
|---|---|---|---|
| 2,868,954 A | | 1/1959 | Skinner et al. |
| 3,264,447 A | * | 8/1966 | Agnew .................. 219/124.02 |
| 4,038,514 A | * | 7/1977 | Ashton ........................ 219/126 |
| 4,095,085 A | * | 6/1978 | Tomita et al. ............... 219/123 |
| 4,097,716 A | * | 6/1978 | Reichelt et al. ......... 219/137 R |
| 4,866,246 A | * | 9/1989 | Church .................... 219/137 R |
| 4,912,299 A | * | 3/1990 | Oros et al. ............. 219/137 PS |
| 4,929,812 A | * | 5/1990 | Ivannikov et al. ....... 219/137.2 |
| 5,159,175 A | * | 10/1992 | Loeber ................... 219/137 R |
| 5,672,286 A | * | 9/1997 | Seeds ................... 219/137 PS |
| 5,756,967 A | | 5/1998 | Quinn et al. |
| 5,811,756 A | * | 9/1998 | Horita et al. ........ 219/137 WM |
| 5,892,199 A | | 4/1999 | Ahmed et al. |
| 6,642,483 B1 | | 11/2003 | Koga et al. ............. 219/137 PS |
| 6,828,526 B1 | * | 12/2004 | Stol et al. ............... 219/137 R |
| 6,872,915 B2 | | 3/2005 | Koga et al. |
| 2002/0008094 A1 | * | 1/2002 | Briand et al. ........... 219/137 R |

* cited by examiner

*Primary Examiner*—Jonathan Johnson
*Assistant Examiner*—Michael Aboagye
(74) *Attorney, Agent, or Firm*—Greenberg Traurig LLP; Peter J. Borghetti

(57) ABSTRACT

Buried arc welding is employed to fuse together a first component, a second component, and a third component or an underlying portion of the second component, the first and second components in butting relationship along a butting joint and the third component or underlying portion of the second component lying beneath the butting joint.

25 Claims, 4 Drawing Sheets

BURIED ARC WELDING OF INTEGRALLY BACKED SQUARE BUTT JOINTS

CROSS REFERENCE TO RELATED APPLICATIONS

This application is closely related to U.S. Pat. No. 6,828,526, titled Gas Metal Buried Arc Welding of Lap-Penetration Joints, filed on May 15, 2003, the teachings of which are fully incorporated by reference herein.

FIELD OF THE INVENTION

The present invention relates to arc welding and, more particularly, it relates to arc welding of integrally backed square butt joints.

BACKGROUND OF THE INVENTION

It is known to make integrally backed square butt joints by gas metal arc welding. Two or three metal components are joined by this process. When three components are joined, two of them are placed in an abutting relationship along an abutting joint, with the third component lying behind the abutting joint. All three are then fused into a single weldment. When two components are joined, the first component of the two is placed in an abutting relationship with a first portion of the second component along an abutting joint, with a second portion of the second component lying behind the abutting joint.

A specific application is to make a bulkhead or deck by butt welding sheets or plates to each other, with stiffening elements, i.e. studs or joists, backing up the butt welded elements, behind the butt welded joints.

FIG. 1 shows a prior art arrangement 10 for making such a weldment. A first component 12 and a second component 14 are placed over a third component 16 with a joint gap 18 between the first component 12 and the second component 14. The components are then secured in that position. A consumable metal electrode 19 is placed over joint gap 18, electrode 19 being of a composition metallurgically compatible with component 12, component 14 and component 16. Typically, electrode 19 has a composition similar to the compositions of component 12, component 14 and component 16.

An electric potential is applied between electrode 19 and the components 12, 14 and 16. An arc is then initiated between electrode 19 and the components 12, 14 and 16. Molten metal from electrode 19, is superheated in the arc and is accelerated towards the joint gap 18, fusing with portions of components 12, 14 and 16. Depending upon the thickness of the joint, multiple passes may be required to build up a plurality of weld beads filling joint gap 18 and thus joining components 12, 14 and 16. A significant expense of this type of welding is that a sufficient quantity of the consumable electrode 19 must be supplied to fill joint gap 18. In addition, the extra number of weld passes and the associated increase in the amount of weld metal and welding heat input per linear length can lead to extra weld induced distortion of the weldment.

FIG. 2 illustrates a prior art arrangement 20 for making an integrally backed square butt joint comprising a first component 12 and a second component 22, the second component 22 having an abutting portion 24 and an underlying portion 26; which underlies first component 12. As before, a joint gap 18 is provided to facilitate welding of component 12 to component 22.

FIG. 3 illustrates a prior art arrangement 30 for making an integrally backed square butt joint comprising first component 32, second component 34 and third component 16, third component 16 underlying first component 32 and second component 34. Arrangement 30 provides a V-shaped joint gap 38 which facilitates the welding process.

FIG. 4 illustrates another prior art arrangement 40 which is for making an integrally backed square butt joint comprising first component 32 and second component 42. Second component 42 includes an abutting portion 44 and an underlying portion 46. As before, arrangement 40 provides a V-shaped joint gap 38 which facilitates the welding process. A significant expense of these prior arrangements having a V-shaped joint gap is due to the requirement for joint preparation, by machining or cutting.

Also, for all of these prior art arrangements, a sufficient quantity of the consumable electrode 19 and welding power must be supplied to fill the joint gap, 18 or 38. Also, welding-induced distortion may occur due to the large amount of metal that must be filled into the joint gap, 18 or 38. Furthermore, a rather wide weld bead results from either of these arrangements.

INTRODUCTION TO THE INVENTION

The cross referenced patent, Gas Metal Buried Arc Welding of Lap-Penetration Joints, U.S. Pat. No. 6,828,526, teaches that gas metal buried arc welding can advantageously be employed for lap penetration joints. Advantages include the ability to melt through and remove oxides from faying surfaces and the ability to penetrate deeply into a stack of two or more components to be joined. With gas metal buried arc welding, surface oxides are removed and are floated to the surface of the weld as slag. It is believed that higher current densities in combination with more intense electromagnetic forces and higher temperatures in the buried arc, in comparison with conventional arc welding, facilitate inciting through and removal of the surface oxides.

In the present invention, the ability of a buried arc to penetrate deeply into one or more workpieces and cut through oxide layers, is employed to make an integrally backed square butt weld without a joint gap such as joint gap 18 or joint gap 38 discussed above.

Advantages to the buried arc include a reduction in the amount of consumable metal electrode which is required, consequent reduction in the heat input per linear length and weld induced distortion, increase in productivity due to the smaller number of weld passes needed to weld the thicker sections and also, it has been found that narrower welds can be obtained Accordingly, it is an objective of the present invention to provide a method of making integrally backed square butt joints using a smaller quantity of consumable metal electrode than the prior art.

It is another objective of the present invention to provide a method of making integrally backed square butt joints that are comprised of either two or three pieces, whereby the former joint is made of a ledge in the "bottom" part onto which the top part is placed so its edge forms a square butt joint with the square edge of the "bottom" part. In this type of joint, the ledge in the "bottom" part functions as the third part of the integrally backed square butt joint that is made up of three pieces.

It is another objective of the present invention to provide a method of making integrally backed square butt joints which is effective in removing oxides from the faying surfaces.

A further objective of the present invention is to provide a method of welding integrally backed square butt joints wherein the welding arc penetrates deeply into the components to be joined.

Another objective of the present invention is to provide a weldment comprising integrally backed members wherein the weld is narrower than prior art welds.

An additional objective of the present invention is to facilitate the operation of machining a bead on a weldment comprising integrally backed square butt welded components, so the bead is flush with the components.

Yet another objective of the present invention is to make integrally backed square butt welded structures without requiring high power density based welding processes such as lasers or electron beams.

Still another objective of the present invention is to reduce welding-induced distortion of integrally backed square butt welds.

SUMMARY OF THE INVENTION

In one aspect, the invention is a method of making a weldment comprising a first component, a second component and a third component, the first component in an abutting relationship with the second component along an abutting joint, the third component in underlying relationship with the first component and the second component beneath the abutting joint. The method includes positioning the first component, the second component and the third component so that the first component is in the abutting relationship with the second component and, also, the third component is in the underlying relationship with the first component and the second component. The method further includes positioning a consumable metal electrode near the first component and the second component, applying an electric potential to the electrode and starting an arc, causing the arc to at least partially bury itself in the abutting joint, the arc forming a cavity for itself, whereby a pool of molten metal beneath the cavity penetrates into the third component. The method further includes maintaining the electric potential and current of the electrode at values appropriate for buried arc welding, and feeding the consumable metal electrode to maintain the tip of the electrode at a distance appropriate for buried arc welding. The method further includes moving the electrode along the abutting joint whereby the arc is likewise moved, and whereby the molten metal solidifies behind the arc to form a weld bead joining the first component to the second component and the third component, thus forming the weldment.

In another aspect, the present invention is a weldment comprising a first component, a second component and a third component, the first component in an abutting relationship with the second component, the third component in underlying relationship with the first component and the second component beneath the abutting joint, a weld bead made by buried arc welding joining the first component, the second component, and the third component.

In a further aspect, the invention is a weldment comprising a first component, a second component and a third component, the first component in abutting relationship with the second component, the third component in underlying relationship with the first component and the second component beneath the abutting joint, a narrow weld bead made by buried arc welding joining the first component, the second component, and the third component.

DETAILED DESCRIPTION OF THE INVENTION

Figure 1:
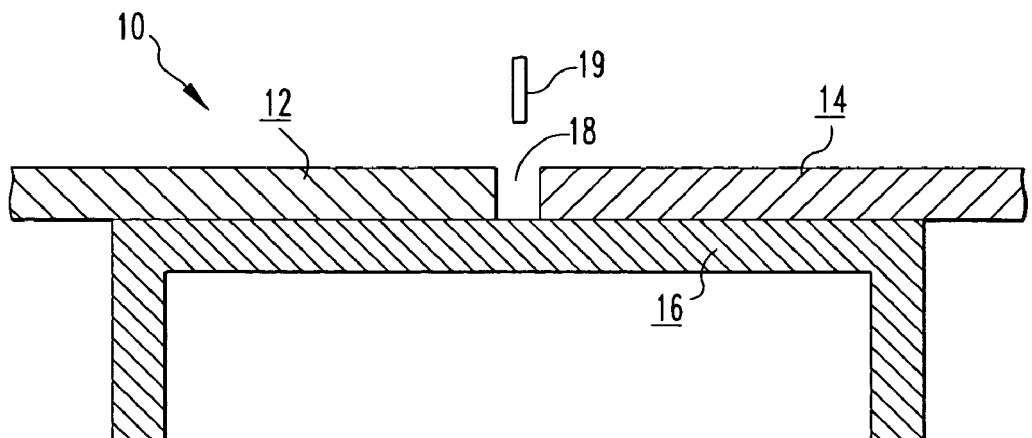
FIG. 1 is a schematic illustration of a prior art arrangement for forming an integrally backed square butt weld by gas metal arc welding.

For purposes of the description hereinafter, the terms "upper", "lower", "level", "above", "below", "beneath" etc and derivatives thereof relate to the invention, as it is oriented in the drawing figures. However, it is to be understood that the invention may assume various alternative orientations, except where expressly specified to the contrary. It is also to be understood that the specific devices and processes illustrated in the drawings, and described in the following specification, are simply exemplary embodiments of the invention. Hence, specific dimensions and other physical characteristics related to the embodiments disclosed herein are not to be considered as limiting.

Figure 2:
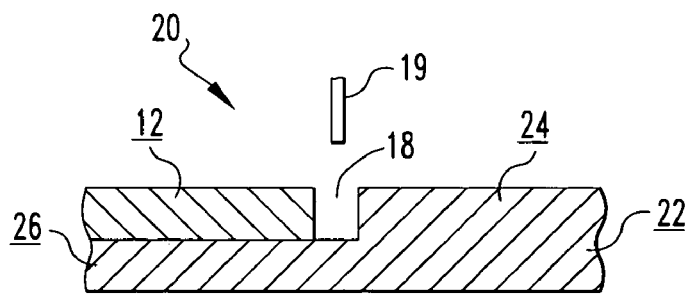
FIG. 2 is a schematic illustration of a prior art arrangement for forming a two component integrally backed butt joint by gas metal arc welding.
Figure 3:
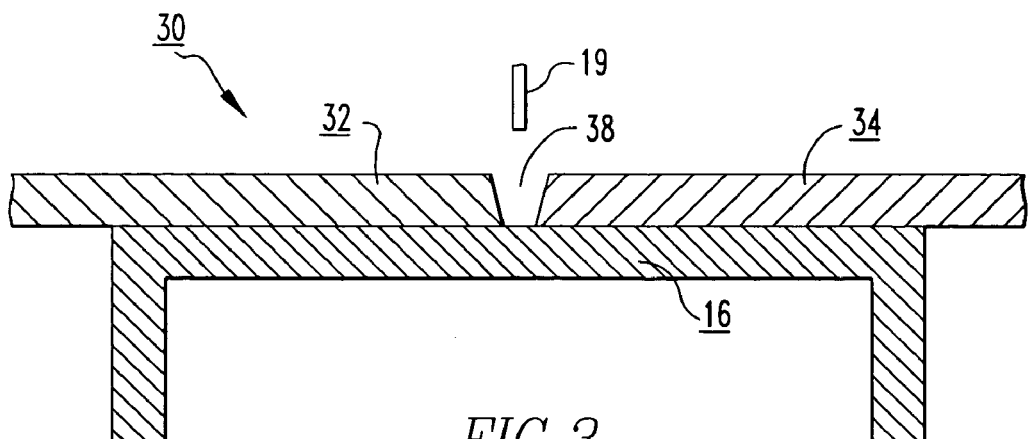
FIG. 3 is a schematic illustration of a prior art arrangement for forming an integrally backed square butt joint wherein a V-shaped joint gap is provided to facilitate the welding process.
Figure 4:
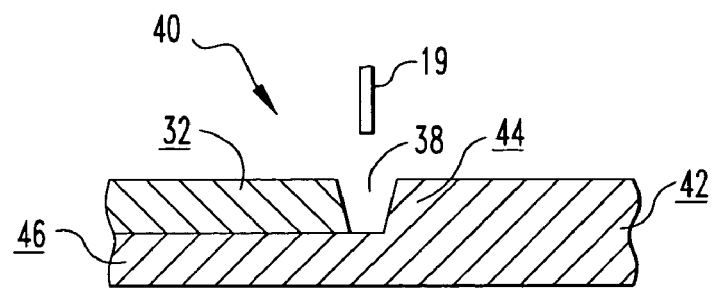
FIG. 4 is a schematic illustration of a prior art arrangement for forming a two component integrally backed butt joint wherein a V-shaped joint gap is provided to facilitate the welding process.
Figure 5:
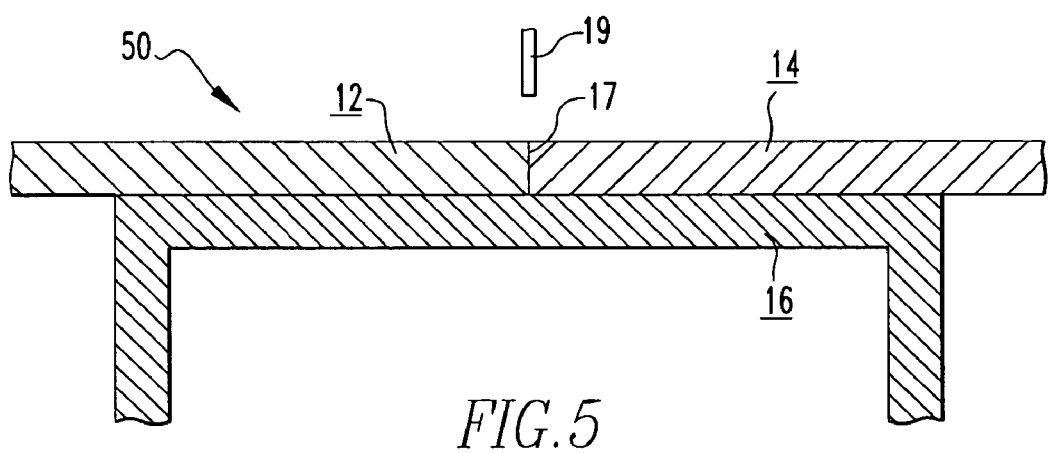
FIG. 5 is a schematic illustration of an arrangement, according to the present invention, for forming an integrally backed square butt joint by gas metal arc welding.

Attention is now directed to FIG. 5 which illustrates an arrangement 50, according to a presently preferred embodiment of the invention, the arrangement being for butt welding component 12 to component 14 and simultaneously joining these to component 16, which underlies components 12 and 14. No joint gap is provided between component 12 and component 14, as was the case for the prior art arrangements illustrated in FIGS. 1 and 2. In the presently preferred embodiment shown in FIG. 5, component 12 lies adjacent component 14 to define an abutting joint 17 therebetween. The consumable metal electrode 19 is placed above the abutting joint 17.

After the arrangement shown in FIG. 5 is established, an arc is initiated, typically by establishing an electric potential (voltage) between the components 12 and 14 being joined and the tip of the consumable metal electrode 19 and by touching it to component 12 and/or component 14.

Figure 6:
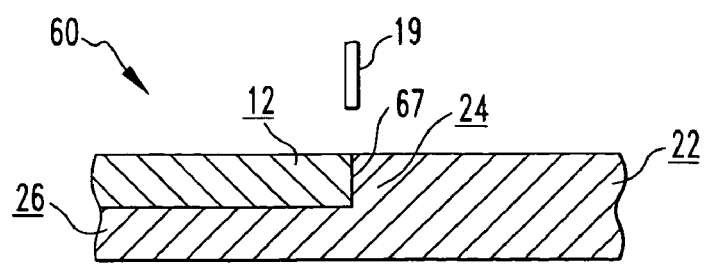
FIG. 6 is a schematic illustration of an arrangement, according to the present invention, for forming a two component integrally backed butt joint by gas metal arc welding.

FIG. 6 illustrates an arrangement 60 for joining a first component 12 to a second component 22, the second component 22 having an abutting portion 24 and an underlying portion 26; underlying portion 26 underlying first component 12. First component 12 is placed adjacent abutting portion 24 of second component 22 to define an abutting joint 67 therebetween.

After the arrangement shown in FIG. 6 is established, an arc is initiated, typically by impressing an electric potential between the components 12 and 22 being joined and the tip of consumable metal electrode 19 and by touching electrode 19 to component 12 and/or component 22.

Figure 7:
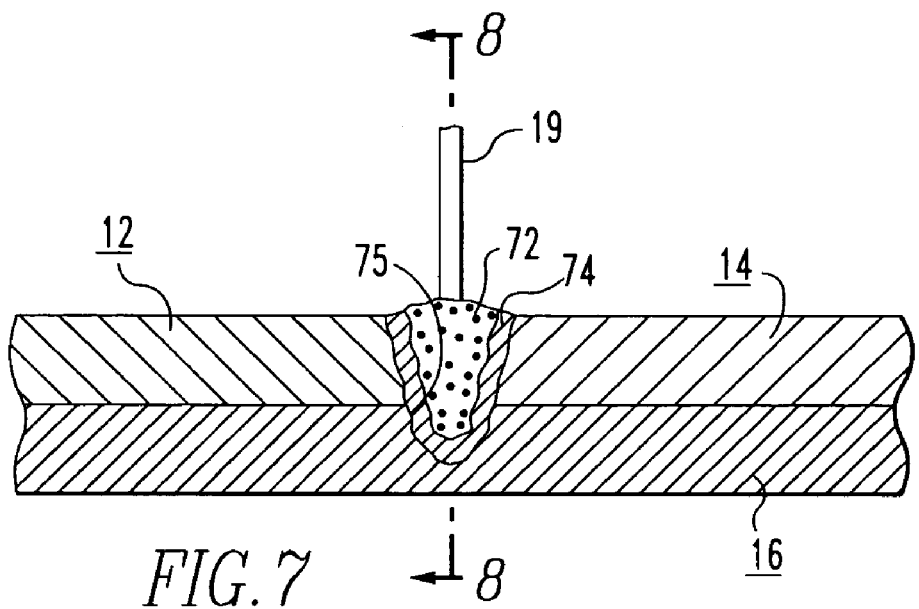
FIG. 7 is a schematic illustrating a section cut through the weld pool during gas metal buried arc welding of an integrally backed square butt joint.

FIG. 7 illustrates the welding process for the arrangement shown in FIG. 5. The arc 72 forms a cavity 75 for itself and for a molten metal layer 74. Cavity 75 subsumes the abutting joint 17, melting portions of the first component 12 and the second component 14, and it penetrates into the third component 16, as illustrated in FIG. 7.

The electric potential and current of the arc are maintained at levels appropriate for buried arc welding, and the elevation of the tip of the consumable metal electrode 19 is maintained at a value appropriate for buried arc welding. The consumable metal electrode 19 is then moved along the abutting joint 17 at a speed appropriate for buried arc welding.

Figure 8:
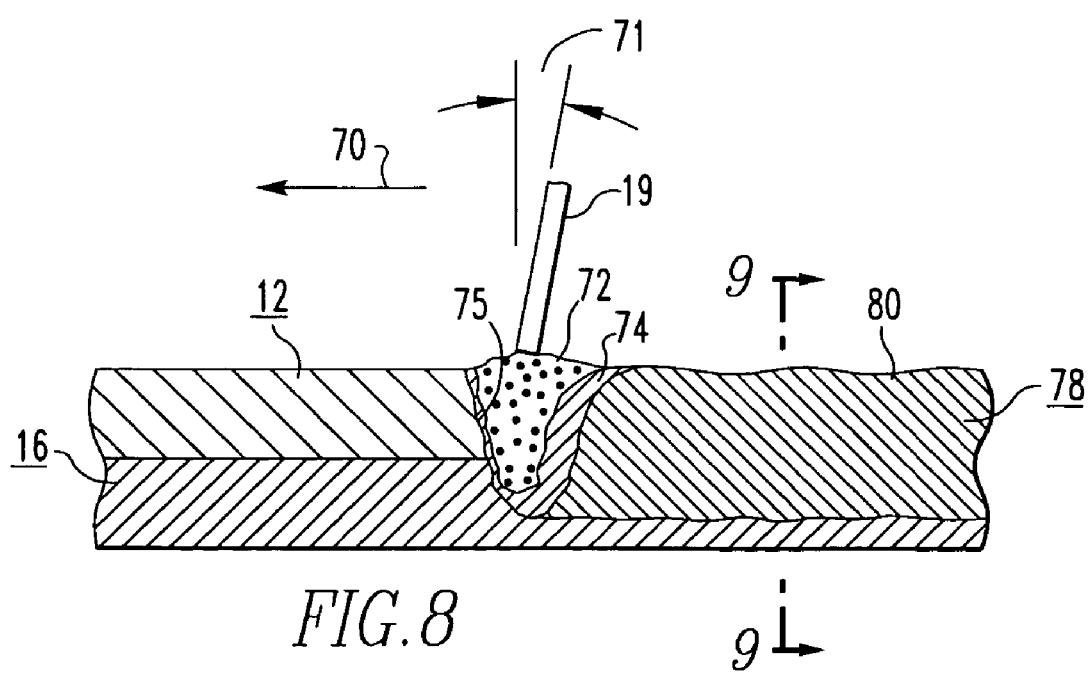
FIG. 8 is a schematic section of the arrangement of FIG. 4 cut along the plane indicated as 8-8 in FIG. 7.

FIG. 8 is a section cut along the plane 8-8 shown in FIG. 7. FIG. 8 shows the direction of movement 70 of the consumable metal electrode 19. The consumable metal electrode 19 is moved at a speed appropriate for buried arc welding in the direction of arrow 70. At this speed, the cavity 75, the buried arc 72 and the molten metal layer 74 are as shown in FIGS. 7 and 8. FIG. 8 also shows the forward travel angle 71 of the consumable metal electrode 19. Molten metal layer 74 on the back side of cavity 75 solidifies to form weld bead 78 having surface 80 behind the buried arc 72.

Figure 9:
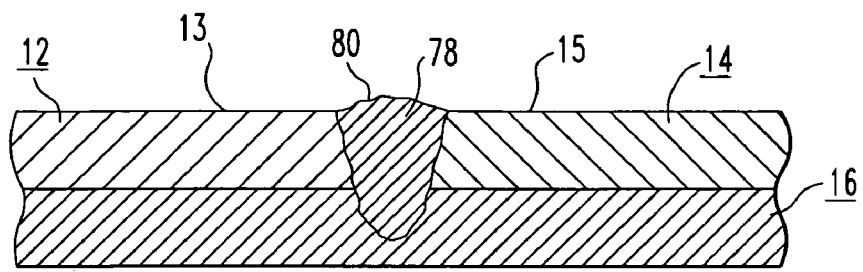
FIG. 9 is a schematic section of a weld made according to the present invention, cut along the plane indicated as 9-9 in FIG. 8.

FIG. 9 is a view cut along line 9-9 in FIG. 8. It shows the weld bead 78 joining the first component 12, the second component 14 and the third, underlying, component 16. The surface 80 of weld bead 78 will generally be higher than the surface 13 of component 12 or surface 15 of component 14.

Figure 10:
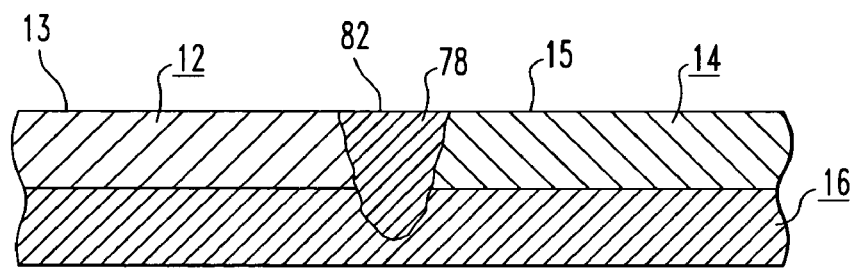
FIG. 10 is a section similar to FIG. 9 with the weld bead machined flush with the surfaces of the components being joined.

FIG. 10 is a view similar to FIG. 9, but FIG. 10 is the configuration after the weld bead 78 has been trimmed so that machined surface 82 of weld bead 78 is flush with surfaces 13 and 15 of components 12 and 14, respectively.

The process of welding the configuration illustrated in FIG. 6 for the two component system is similar to the process discussed above for the configuration illustrated in FIG. 5, which is for the three component system.

Numerical Values for the Presently Preferred Embodiments

It has been found that the method described above works well for the component thicknesses and operational parameters which follow.

When making a three component integrally backed butt weld, as shown in FIG. 5, it has been believed that the first component 12 and the second component 14 should have a thickness of at least about 1 mm and, preferably, no more than about 18 mm. The process has been found to work well when these components have a thickness of about 3.5 mm. The thickness range from 1 to 18 mm also applies to the thickness of the abutting portion 24 of the second component 22 illustrated in FIG. 6. The method is recommended for the aluminum alloy 5383-H34.

The method is believed to work well when the thickness of the third component 16, or the underlying portion 26 of second component 22 is from about 3 mm to about 7 mm. The process has been found to work well when the thickness of the third component 16, is about 4.5 mm. The method worked well when the third component 16 was an extruded stiffener comprised of the aluminum alloy 6061-T6. For these alloys, a consumable metal electrode comprised of aluminum alloy 5356 and 1.6 mm in diameter is recommended. The forward travel angle 27 of the consumable electrode 19, preferably, should be about 5-15 degrees.

The electric potential and current of the arc should be appropriate for buried arc welding. It is believed that the electric potential should be in a range from 17-29 Volts, and that the current should be in a range from 70-600 Amperes. Generally, higher values of electric potential and current should be employed for welding thicker components according to this principle. For the presently preferred thicknesses cited above, an electric potential of about 25.7 Volts and a current of about 326 Amperes has been found to work well.

The consumable metal electrode was supplied at about 7.5 meters per minute, and the speed of travel of the electrode was 0.86 meters/minute.

Figure 11:
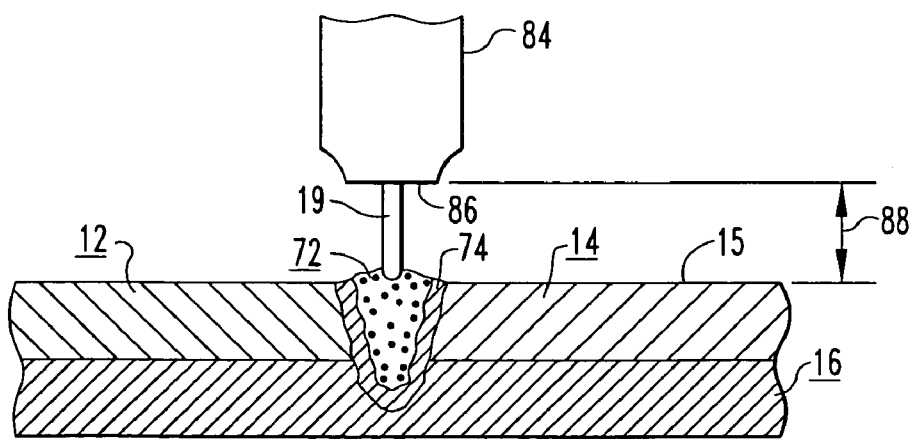
FIG. 11 is a schematic illustration showing a shielding cup which supplies inert gas to the area being welded.

For situations wherein the components to be joined are comprised of aluminum alloys, a shielding gas is required. FIG. 11 shows a shielding cup 84 for supplying a laminar flow of a shielding gas such as argon. Shielding cup 84 has a bottom edge 86 located at a standoff distance 88 from the surface 15 of second component 14. The standoff distance 58 was about 9.5 mm.

The preferred orientation for this process is the "flat down hand" position. For the three component system, the first component 12 and second component 14 are flat with third component 16 beneath the abutting joint 17 between them. For the two component system, first component 12 and second component 22 are flat, with the underlying portion 26 of second component 22 beneath the abutting joint 67, between first component 12 and the abutting portion 24 of second component 22.

Specific embodiments of the invention has been described above. It is to be understood, of course, that the invention may be otherwise embodied within the scope of the appended claims.

I claim:

1. A method of making a weldment comprising an integrally backed square butt joint, said method comprising:

positioning a first component in an abutting relationship with at least a portion of a second component and a third component underlying said abutting relationship between said first component and said second component, said components being metallurgically compatible;

positioning a consumable metal electrode near said abutting relationship between said first component and said second component, said consumable metal electrode being metallurgically compatible with said components;

applying an electric potential to said electrode relative to an electric potential of said components;

developing an arc between said electrode and said components;

causing said arc to at least partially bury itself in said abutting relationship, said arc forming a cavity for itself and for a pool of molten metal whereby said pool of molten metal penetrates into said third component;

maintaining an electric potential and current of said arc at values appropriate for buried arc welding;

feeding said electrode to maintain a tip of said electrode at a distance appropriate for buried arc welding; and moving said electrode along said abutting relationship between said first component and said second component, wherein said arc and said cavity are likewise moved, and wherein said molten metal solidifies behind said arc to form a weld bead joining said first component to said second component and to said third component, wherein said components are joined, thereby forming said weldment.

2. The method, according to claim 1, wherein said weld bead has a surface higher than a surface of said pool of molten metal beneath said arc.

3. The method, according to claim 1, wherein said weld bead has a surface higher than a surface of either said first component or said second component.

4. The method, according to claim 1, further comprising reducing power and feed rate of said electrode to fill said cavity when said weld bead is finished.

5. The method, according to claim 1, wherein at least one of said components is comprised of an aluminum alloy.

6. The method, according to claim 5, wherein said aluminum alloy is a fusion weldable aluminum alloy.

7. The method, according to claim 5, wherein said aluminum alloy is 5383-H34.

8. The method, according to claim 5, wherein said aluminum alloy is 6061-T6.

9. The method, according to claim 1, wherein at least one of said components is comprised of a fusion weldable alloy.

10. The method, according to claim 9, wherein said fusion weldable alloy is a stainless steel, titanium or copper alloy.

11. The method, according to claim 1, wherein at least one of said first component and said second component or said abutting portion of said second component has a thickness in a vicinity of said abutting joint of at least about 1 mm.

12. The method, according to claim 1, wherein at least one of said first component and said second component or said abutting portion of said second component has a thickness in a vicinity of said abutting joint no greater than about 18 mm.

13. The method, according to claim 1, wherein at least one of said first component and said second component or said abutting portion of said second component has a thickness in a vicinity of said abutting joint of about 3.5 mm.

14. The method, according to claim 1, wherein a thickness of said third component or said underlying portion of said second component in a vicinity of said abutting joint is at least about 3 mm.

15. The method, according to claim 1, wherein a thickness of said third component or said underlying portion of said second component in a vicinity of said abutting joint is no more than about 7 mm.

16. The method, according to claim 1, wherein a thickness of said third component or said underlying portion of said third component in a vicinity of said abutting joint is about 4.5 mm.

17. The A method, according to claim 1, wherein said consumable metal electrode is comprised of an aluminum welding filler alloy.

18. The method, according to claim 17, wherein said aluminum welding filler alloy is 5083 or 5356.

19. The method, according to claim 1, wherein an electric potential of the single consumable metal electrode relative to the components ranges from about 17 Volts to about 29 Volts.

20. The method, according to claim 1, wherein a diameter of said electrode is about 1.6 mm.

21. The method, according to claim 1, wherein a welding position for said method is flat down-hand.

22. The method, according to claim 1, wherein said single consumable metal electrode is supplied at about 7.51 meters per minute.

23. The method, according to claim 1, wherein a welding speed of travel along said abutting joint is about 0.86 meters/minute.

24. The method, according to claim 1, wherein a forward travel angle of said consumable metal electrode is about 5-15 degrees.

25. The method, according to claim 1, wherein said current ranges from about 70 Amperes to about 600 Amperes.

* * * * *

UNITED STATES PATENT AND TRADEMARK OFFICE
CERTIFICATE OF CORRECTION

PATENT NO. : 7,371,994 B2 Page 1 of 1
APPLICATION NO. : 10/913096
DATED : May 13, 2008
INVENTOR(S) : Israel Stol It is certified that error appears in the above-identified patent and that said Letters Patent is hereby corrected as shown below:

In column 2, line 38, after "facilitate", delete "inciting" and insert --melting--.

In column 8, line 16, line 1 of Claim 17, after "The" remove "A".

Signed and Sealed this

Fifteenth Day of July, 2008

JON W. DUDAS
*Director of the United States Patent and Trademark Office*